US012672678B2

(12) United States Patent
Lord

(10) Patent No.: US 12,672,678 B2
(45) Date of Patent: *Jul. 7, 2026

(54) ELECTRONIC INHALATION DEVICE WITH SUSPENSION FUNCTION

(71) Applicant: NICOVENTURES TRADING LIMITED, London (GB)

(72) Inventor: Christopher Lord, London (GB)

(73) Assignee: NICOVENTURES TRADING LIMITED, London (GB)

( * ) Notice: Subject to any disclaimer, the term of this patent is extended or adjusted under 35 U.S.C. 154(b) by 636 days.

This patent is subject to a terminal disclaimer.

(21) Appl. No.: 17/446,010

(22) Filed: Aug. 26, 2021

(65) Prior Publication Data

US 2021/0386122 A1      Dec. 16, 2021

Related U.S. Application Data

(60) Continuation of application No. 15/231,359, filed on Aug. 8, 2016, now Pat. No. 11,129,418, which is a
(Continued)

(30) Foreign Application Priority Data

Oct. 19, 2012      (GB) ...................................... 1218817

(51) Int. Cl.
*A24F 40/50*          (2020.01)
*A24F 40/10*          (2020.01)
(Continued)

(52) U.S. Cl.
CPC .............. *A24F 40/50* (2020.01); *A24F 40/60* (2020.01); *G05B 23/0267* (2013.01);
(Continued)

(58) Field of Classification Search
CPC .......... A24F 40/50; A24F 40/60; A24F 40/10; A24F 47/008; A24F 40/51; A24F 40/42;
(Continued)

(56) References Cited

U.S. PATENT DOCUMENTS 947,999  A      2/1910    Schweppe
2,057,353  A    10/1936    Whittemore
(Continued)

FOREIGN PATENT DOCUMENTS

AU          2016244243  B2      12/2018
CA              2641869  A1       5/2010
(Continued)

OTHER PUBLICATIONS

Notice of Reasons for Refusal in corresponding Japanese Patent Application No. 2022-015066 dated Aug. 22, 2023, all pages cited in its entirety.
(Continued)

*Primary Examiner* — Charles Cai
(74) *Attorney, Agent, or Firm* — Burr & Forman

(57) ABSTRACT

An electronic inhalation device comprising a power cell and a computer. The computer comprises a computer processor, a memory and an input-output means. The computer is configured in use to enter a menu mode when a user activates the menu mode. The device may include use data relating to a user's use of the device. The use data may be stored in the computer memory. In the menu mode, a selected menu option may clear the use data from the computer memory and/or a selected menu option may activate the transmission of the use data.

18 Claims, 5 Drawing Sheets

Related U.S. Application Data division of application No. 14/432,752, filed as application No. PCT/EP2013/071070 on Oct. 9, 2013, now Pat. No. 9,462,832.

(51) Int. Cl.
| | |
|---|---|
| *A24F 40/60* | (2020.01) |
| *G05B 23/02* | (2006.01) |
| *H05B 1/02* | (2006.01) |

(52) U.S. Cl.
CPC ............ *H05B 1/0244* (2013.01); *A24F 40/10* (2020.01); *H05B 2203/021* (2013.01)

(58) Field of Classification Search
CPC ..... A24F 40/46; A24F 40/53; G05B 23/0267; H05B 1/0244; H05B 2203/021; A24B 15/167
See application file for complete search history.

(56) References Cited

U.S. PATENT DOCUMENTS

| | | | |
|---|---|---|---|
| 4,947,875 A | 8/1990 | Brooks et al. | |
| 5,095,921 A | 3/1992 | Losee et al. | |
| 5,261,424 A | 11/1993 | Sprinkel, Jr. | |
| 5,363,842 A | 11/1994 | Mishelevich et al. | |
| 5,372,148 A | 12/1994 | McCafferty et al. | |
| 5,794,612 A | 8/1998 | Wachter et al. | |
| 5,809,997 A | 9/1998 | Wolf | |
| 5,894,841 A | 4/1999 | Voges | |
| 5,949,632 A | 9/1999 | Barreras, Sr. et al. | |
| 6,040,560 A | 3/2000 | Fleischhauer et al. | |
| 6,183,425 B1 | 2/2001 | Whalen et al. | |
| 6,196,218 B1 | 3/2001 | Voges | |
| 6,202,642 B1 | 3/2001 | McKinnon et al. | |
| 6,452,510 B1* | 9/2002 | Zysko | B64D 25/00 |
| | | | 701/4 |
| 6,513,723 B1* | 2/2003 | Mueller | F23N 5/022 |
| | | | 236/51 |
| 6,606,997 B2 | 8/2003 | Brue | |
| 6,873,322 B2 | 3/2005 | Hartular | |
| 6,958,691 B1 | 10/2005 | Anderson et al. | |
| 7,109,445 B2 | 9/2006 | Patterson et al. | |
| 7,726,320 B2 | 6/2010 | Robinson et al. | |
| 7,726,329 B2 | 6/2010 | Armiroli et al. | |
| 8,159,204 B2 | 4/2012 | Grant | |
| 8,550,069 B2 | 10/2013 | Alelov | |
| 8,807,131 B1 | 8/2014 | Tunnell et al. | |
| 8,997,753 B2 | 4/2015 | Li et al. | |
| 9,095,175 B2 | 8/2015 | Terry et al. | |
| 9,289,014 B2 | 3/2016 | Tucker et al. | |
| 9,451,791 B2 | 9/2016 | Sears et al. | |
| 9,462,832 B2 | 10/2016 | Lord | |
| 9,497,999 B2 | 11/2016 | Lord | |
| 9,597,466 B2 | 3/2017 | Henry, Jr. et al. | |
| 10,117,460 B2 | 11/2018 | Sears et al. | |
| 10,159,279 B2 | 12/2018 | Lord et al. | |
| 2002/0055792 A1* | 5/2002 | Lee | G09G 1/165 |
| | | | 345/533 |
| 2003/0033055 A1 | 2/2003 | McRae et al. | |
| 2003/0123328 A1 | 7/2003 | Guanter | |
| 2003/0123329 A1 | 7/2003 | Guanter et al. | |
| 2003/0179003 A1 | 9/2003 | Toda et al. | |
| 2003/0226837 A1 | 12/2003 | Blake et al. | |
| 2005/0045193 A1 | 3/2005 | Yang | |
| 2005/0058441 A1 | 3/2005 | Kameyama et al. | |
| 2005/0081846 A1 | 4/2005 | Barney | |
| 2005/0143866 A1 | 6/2005 | McRae et al. | |
| 2005/0161467 A1 | 7/2005 | Jones | |
| 2005/0247305 A1 | 11/2005 | Zierenberg et al. | |
| 2005/0268911 A1* | 12/2005 | Cross | A61M 11/042 |
| | | | 128/203.26 |
| 2006/0047368 A1 | 3/2006 | Maharajh et al. | |
| 2006/0130838 A1 | 6/2006 | Lee et al. | |
| 2006/0130860 A1 | 6/2006 | Cholet | |
| 2007/0006889 A1 | 1/2007 | Kobal et al. | |
| 2007/0045288 A1 | 3/2007 | Nelson | |
| 2008/0092912 A1 | 4/2008 | Robinson et al. | |
| 2008/0257367 A1 | 10/2008 | Paterno et al. | |
| 2009/0230117 A1 | 9/2009 | Fernando et al. | |
| 2009/0283103 A1 | 11/2009 | Nielsen et al. | |
| 2009/0308387 A1 | 12/2009 | Andersen et al. | |
| 2010/0050770 A1 | 3/2010 | Barger et al. | |
| 2010/0059070 A1 | 3/2010 | Potter et al. | |
| 2010/0180754 A1* | 7/2010 | Brown | G10L 15/26 |
| | | | 84/610 |
| 2010/0192948 A1 | 8/2010 | Sutherland et al. | |
| 2010/0206306 A1 | 8/2010 | Feriani et al. | |
| 2010/0242974 A1 | 9/2010 | Pan | |
| 2011/0036346 A1 | 2/2011 | Cohen et al. | |
| 2011/0110746 A1 | 5/2011 | Smith | |
| 2011/0113368 A1 | 5/2011 | Carvajal et al. | |
| 2011/0193704 A1* | 8/2011 | Harper | A61B 5/145 |
| | | | 340/505 |
| 2011/0210746 A1 | 9/2011 | Yugou et al. | |
| 2011/0226236 A1 | 9/2011 | Buchberger | |
| 2011/0247620 A1 | 10/2011 | Armstrong et al. | |
| 2011/0253139 A1 | 10/2011 | Guthrie et al. | |
| 2011/0265806 A1 | 11/2011 | Alarcon et al. | |
| 2011/0304282 A1 | 12/2011 | Li et al. | |
| 2012/0012106 A1 | 1/2012 | Bari | |
| 2012/0048266 A1 | 3/2012 | Alelov | |
| 2012/0060853 A1 | 3/2012 | Robinson et al. | |
| 2012/0186594 A1 | 7/2012 | Liu | |
| 2012/0208601 A1 | 8/2012 | Lockwood | |
| 2012/0214107 A1 | 8/2012 | Al Gharib | |
| 2012/0318882 A1 | 12/2012 | Abehasera | |
| 2013/0008436 A1 | 1/2013 | Von Hollen et al. | |
| 2013/0042865 A1 | 2/2013 | Monsees et al. | |
| 2013/0104916 A1 | 5/2013 | Bellinger et al. | |
| 2013/0147704 A1 | 6/2013 | Kuo et al. | |
| 2013/0192615 A1 | 8/2013 | Tucker et al. | |
| 2013/0192622 A1 | 8/2013 | Tucker et al. | |
| 2013/0199528 A1 | 8/2013 | Goodman et al. | |
| 2013/0228191 A1 | 9/2013 | Newton | |
| 2013/0255702 A1 | 10/2013 | Griffith, Jr. et al. | |
| 2013/0269685 A1 | 10/2013 | Wachtel et al. | |
| 2013/0284192 A1* | 10/2013 | Peleg | A24F 40/53 |
| | | | 131/329 |
| 2013/0319439 A1 | 12/2013 | Gorelick et al. | |
| 2013/0340755 A1 | 12/2013 | Ruff | |
| 2013/0340775 A1 | 12/2013 | Juster et al. | |
| 2014/0000603 A1 | 1/2014 | Hosemann et al. | |
| 2014/0000638 A1 | 1/2014 | Sebastian et al. | |
| 2014/0008384 A1 | 1/2014 | Helmlinger | |
| 2014/0014126 A1 | 1/2014 | Peleg et al. | |
| 2014/0060554 A1 | 3/2014 | Collett et al. | |
| 2014/0068272 A1* | 3/2014 | Savtchenko | H04L 9/3226 |
| | | | 713/185 |
| 2014/0096781 A1 | 4/2014 | Sears et al. | |
| 2014/0123990 A1 | 5/2014 | Timmermans | |
| 2014/0209105 A1 | 7/2014 | Sears et al. | |
| 2014/0246035 A1 | 9/2014 | Minskoff et al. | |
| 2014/0261414 A1 | 9/2014 | Weitzel et al. | |
| 2014/0261486 A1 | 9/2014 | Potter et al. | |
| 2014/0270727 A1 | 9/2014 | Ampolini et al. | |
| 2014/0334804 A1* | 11/2014 | Choi | A24F 40/485 |
| | | | 392/404 |
| 2014/0345635 A1 | 11/2014 | Rabinowitz et al. | |
| 2014/0366894 A1 | 12/2014 | Liu | |
| 2014/0366898 A1 | 12/2014 | Monsees et al. | |
| 2015/0047656 A1 | 2/2015 | Robinson et al. | |
| 2015/0097513 A1 | 4/2015 | Liberti et al. | |
| 2015/0114408 A1 | 4/2015 | Lord | |
| 2015/0128965 A1 | 5/2015 | Lord | |
| 2015/0128966 A1 | 5/2015 | Lord | |
| 2015/0136153 A1 | 5/2015 | Lord | |
| 2015/0173124 A1 | 6/2015 | Qiu | |
| 2015/0174348 A1 | 6/2015 | Tunnell et al. | |
| 2015/0237917 A1 | 8/2015 | Lord | |
| 2015/0245660 A1 | 9/2015 | Lord | |
| 2015/0257448 A1 | 9/2015 | Lord | |
| 2015/0336689 A1 | 11/2015 | Brown et al. | |

(56) References Cited

U.S. PATENT DOCUMENTS

| | | | |
|---|---|---|---|
| 2016/0021930 A1 | 1/2016 | Minskoff et al. | |
| 2016/0206000 A1 | 7/2016 | Lord et al. | |
| 2016/0242466 A1 | 8/2016 | Lord et al. | |
| 2016/0255878 A1 | 9/2016 | Huang et al. | |
| 2017/0035114 A1 | 2/2017 | Lord | |
| 2017/0245547 A1 | 8/2017 | Lipowicz | |
| 2018/0106493 A1* | 4/2018 | Hoglund | F24F 11/80 |
| 2018/0153223 A1 | 6/2018 | Lord | |
| 2019/0133192 A1 | 5/2019 | Lord et al. | |
| 2021/0345681 A1 | 11/2021 | Cameron | |
| 2022/0291930 A1 | 9/2022 | Litvinov et al. | |

FOREIGN PATENT DOCUMENTS

| | | | |
|---|---|---|---|
| CA | 2876267 A1 | 6/2015 | |
| CN | 1280661 A | 1/2001 | |
| CN | 1330563 A | 1/2002 | |
| CN | 1428671 A | 7/2003 | |
| CN | 1812529 A | 8/2006 | |
| CN | 101130121 A | 2/2008 | |
| CN | 201029436 Y | 3/2008 | |
| CN | 201044608 Y | 4/2008 | |
| CN | 101176804 A | 5/2008 | |
| CN | 201213951 Y | 4/2009 | |
| CN | 201238610 Y | 5/2009 | |
| CN | 101518361 A | 9/2009 | |
| CN | 101557728 A | 10/2009 | |
| CN | 100566769 C | 12/2009 | |
| CN | 201379072 Y | 1/2010 | |
| CN | 201393548 Y | 2/2010 | |
| CN | 201821914 U | 5/2011 | |
| CN | 201830899 U | 5/2011 | |
| CN | 102143339 A | 8/2011 | |
| CN | 102247640 A | 11/2011 | |
| CN | 102264249 A | 11/2011 | |
| CN | 102264251 A | 11/2011 | |
| CN | 102934843 A | 2/2013 | |
| CN | 102970885 A | 3/2013 | |
| CN | 202890466 U | 4/2013 | |
| CN | 203070141 U | 7/2013 | |
| CN | 103237468 A | 8/2013 | |
| CN | 103415222 A | 11/2013 | |
| CN | 104049550 A | 9/2014 | |
| CN | 203841114 U | 9/2014 | |
| CN | 203986103 U | 12/2014 | |
| CN | 104540406 A | 4/2015 | |
| CN | 204335831 U | 5/2015 | |
| DE | 102009029768 A1 | 1/2011 | |
| EA | 019736 B1 | 5/2014 | |
| EP | 0430559 A2 | 6/1991 | |
| EP | 1712178 A2 | 10/2006 | |
| EP | 2143346 A1 | 1/2010 | |
| EP | 2404515 A1 | 1/2012 | |
| EP | 2460423 A1 | 6/2012 | |
| EP | 2727619 A2 | 5/2014 | |
| EP | 2908675 A1 | 8/2015 | |
| EP | 3116334 A1 | 1/2017 | |
| EP | 3154382 A1 | 4/2017 | |
| EP | 3307097 A1 | 4/2018 | |
| EP | 2908675 B1 | 1/2019 | |
| EP | 3054798 B1 | 5/2019 | |
| EP | 3316711 B1 | 5/2019 | |
| ES | 1091555 U | 10/2013 | |
| GB | 2468932 A | 9/2010 | |
| GB | 201218817 A1 | 10/2012 | |
| GB | 2502053 A | 11/2013 | |
| GB | 2502055 A | 11/2013 | |
| GB | 2502162 A | 11/2013 | |
| GB | 2502163 A | 11/2013 | |
| GB | 2502164 A | 11/2013 | |
| GB | 2507103 A | 4/2014 | |
| GB | 2507104 A | 4/2014 | |
| GB | 2514767 A | 12/2014 | |
| GB | 2519101 A | 4/2015 | |
| JP | H05212100 A | 8/1993 | |
| JP | H07506008 A | 7/1995 | |
| JP | H08511966 A | 12/1996 | |
| JP | 2001502542 A | 2/2001 | |
| JP | 3392138 B2 | 3/2003 | |
| JP | 2005070953 A | 3/2005 | |
| JP | 3696619 B2 | 9/2005 | |
| JP | 2006018057 A | 1/2006 | |
| JP | 2006507499 A | 3/2006 | |
| JP | 2006338178 A | 12/2006 | |
| JP | 3976345 B2 | 9/2007 | |
| JP | 2008299999 A | 12/2008 | |
| JP | 2009022752 A | 2/2009 | |
| JP | 3159830 U | 6/2010 | |
| JP | 2013524835 A | 6/2013 | |
| JP | 2013545474 A | 12/2013 | |
| JP | 2014504886 A | 2/2014 | |
| JP | 2014534814 A | 12/2014 | |
| JP | 2015512262 A | 4/2015 | |
| JP | 6545226 B2 | 6/2019 | |
| KR | 0178388 B1 | 2/1999 | |
| KR | 100495099 B1 | 11/2005 | |
| KR | 20110002227 U | 3/2011 | |
| KR | 20110132290 A | 12/2011 | |
| KR | 20120093046 A | 8/2012 | |
| KR | 1020120089545 A | 8/2012 | |
| KR | 101256914 B1 | 4/2013 | |
| RU | 72821 U1 | 5/2008 | |
| RU | 2336001 C2 | 10/2008 | |
| RU | 2336002 C2 | 10/2008 | |
| RU | 2382657 C1 | 2/2010 | |
| RU | 94815 U1 | 6/2010 | |
| RU | 2425608 C2 | 8/2011 | |
| RU | 110608 U1 | 11/2011 | |
| RU | 124120 U1 | 1/2013 | |
| RU | 2509516 C2 | 3/2014 | |
| SE | 9900703 L | 12/1999 | |
| TW | M355104 U | 4/2009 | |
| TW | 200928407 A | 7/2009 | |
| UA | 92474 C2 | 11/2010 | |
| UA | 67598 U | 2/2012 | |
| UA | 100068 C2 | 11/2012 | |
| UA | 100734 C2 | 1/2013 | |
| UA | 78167 U | 3/2013 | |
| UA | 102423 C2 | 7/2013 | |
| WO | WO-9118860 A1 | 12/1991 | |
| WO | WO-9418860 A1 | 9/1994 | |
| WO | WO-9501137 A1 | 1/1995 | |
| WO | 9507723 A1 | 3/1995 | |
| WO | WO-9817131 A1 | 4/1998 | |
| WO | WO-0064517 A1 | 11/2000 | |
| WO | 2004047570 A2 | 6/2004 | |
| WO | WO-2004080216 A1 | 9/2004 | |
| WO | WO-2004095955 A1 | 11/2004 | |
| WO | WO-2008139411 A2 | 11/2008 | |
| WO | WO-2008142015 A2 | 11/2008 | |
| WO | WO-2009045198 A1 | 4/2009 | |
| WO | WO-2009063814 A1 | 5/2009 | |
| WO | WO-2009118085 A1 | 10/2009 | |
| WO | WO-2009146484 A1 | 12/2009 | |
| WO | WO-2010003480 A1 | 1/2010 | |
| WO | WO-2010073122 A1 | 7/2010 | |
| WO | WO-2010091593 A1 | 8/2010 | |
| WO | WO-2010118644 A1 | 10/2010 | |
| WO | WO-2010145805 A1 | 12/2010 | |
| WO | WO-2011079932 A1 | 7/2011 | |
| WO | WO-2011137453 A2 | 11/2011 | |
| WO | WO-2011147699 A1 | 12/2011 | |
| WO | 2012026963 A2 | 3/2012 | |
| WO | WO-2012027350 A2 | 3/2012 | |
| WO | WO-2012048266 A1 | 4/2012 | |
| WO | WO-2012072790 A1 | 6/2012 | |
| WO | WO-2012109371 A2 | 8/2012 | |
| WO | WO-2012117376 A1 | 9/2012 | |
| WO | WO-2012120487 A2 | 9/2012 | |
| WO | WO-2013060781 A1 | 5/2013 | |
| WO | WO-2013060784 A2 | 5/2013 | |
| WO | WO-2013060874 A1 | 5/2013 | |
| WO | WO-2013098397 A2 | 7/2013 | |
| WO | WO-2013098398 A2 | 7/2013 | |

(56) References Cited

FOREIGN PATENT DOCUMENTS

| WO | WO-2013116572 A1 | 8/2013 |
| WO | WO-2013138384 A2 | 9/2013 |
| WO | WO-2013148810 A1 | 10/2013 |
| WO | WO-2014004437 A1 | 1/2014 |
| WO | WO-2014037794 A2 | 3/2014 |
| WO | WO-2014054035 A1 | 4/2014 |
| WO | WO-2014060268 A1 | 4/2014 |
| WO | WO-2014060269 A1 | 4/2014 |
| WO | WO-2015052513 A2 | 4/2015 |
| WO | WO-2015138589 A1 | 9/2015 |
| WO | WO-2015192084 A1 | 12/2015 |
| WO | WO-2016009202 A1 | 1/2016 |
| WO | WO-2016198266 A1 | 12/2016 |
| WO | WO-2017001817 A1 | 1/2017 |

OTHER PUBLICATIONS

Notice of Third Office Action and Supplementary Search Report for corresponding Chinese Patent Application No. 2020107040344 issued Nov. 29, 2023, all pages cited in its entirety.
Notice of Reason for Refusal received for Japanese Patent Application No. 2022-015066, mailed on Jan. 17, 2023, 8 pages (4 pages of English Translation and 4 pages of Official Copy).
Application and File History for U.S. Appl. No. 14/401,511, filed Nov. 14, 2014, Inventor: Christopher Lord, 561 pages.
Application and File History for U.S. Appl. No. 14/432,752, filed Mar. 31, 2015, Inventor: Christopher Lord, 387 pages.
Application and File History for U.S. Appl. No. 15/027,344, filed Apr. 5, 2016, 535 pages, Inventors: Lord et al.
Application and File History for U.S. Appl. No. 15/231,359, filed Aug. 8, 2016, Inventor: Christopher Lord, 572 pages.
Application and File History for U.S. Appl. No. 15/739,019, filed Dec. 21, 2017, Inventor, Dickens, 525 pages.
Cambridge dictionary online, "Dictionary definition for Tap", Jan. 27, 2020, 16 pages.
Decision of Grant mailed Feb. 16, 2016 for Russian Application No. 2014150496, 7 pages.
Decision to Grant for Japanese Application No. 2015-537196, dated Jul. 6, 2017, 3 pages (6 pages with translation).
Decision to Grant mailed Feb. 28, 2019 for Russian Application No. 2018129541, 14 pages.
Decision to Grant mailed Oct. 30, 2018 for Russia Application No. 2017145807, 13 pages.
Decision to Grant mailed Aug. 24, 2016 for Russian Application No. 201511435112, 12 pages.
European Patent Office Communication for Application No. EP16729349.7, dated Feb. 12, 2020, 53 pages.
Examination Report mailed Feb. 3, 2020 for European Application No. 18207065.6, 5 pages.
Examination Report No. 1 mailed May 2, 2016 for New Zealand Application No. 717778, 4 pages.
Extended European Search Report for U.S. Appl. No. 18/207,065, mailed on 12, Apr. 2019, 8 pages.
Extended European Search Report for Application No. 19164915.1, mailed on Jul. 8, 2019, 8 pages.
Extended Report for European Application No. 13779773.4, dated Jun. 20, 2016, 2 pages.
Extended Report mailed Aug. 15, 2016 for New Zealand Application No. 71778, 3 pages.
Extended Report mailed Nov. 16, 2016 for New Zealand Application No. 717778, 1 page.
Farsalinos Konstantinos et al., "Evaluation of Electronic Cigarette Use (Vaping) Topography and Estimation of Liquid Consumption: Implications for Research Protocol Standards Definition and for Public Health Authorities Regulation" Int J Environ. Res. Public Health, 2013, pp. 2500-2514.
First Examination Report for Australian Application No. 2013261801, dated Jul. 10, 2015, 2 pages.

First Extended Report for Australian Application No. 2013331849, dated Dec. 1, 2015, 3 pages.
First Extended Report for Australian Application No. 2014333571, dated Nov. 25, 2016, 4 pages.
First Office Action and Search Report for Chinese Patent Application No. 201811568130, mailed on Apr. 8, 2021, 22 pages.
First Office Action for Chinese Application No. 201380054442.8 dated Aug. 30, 2016, 4 pages.
International Preliminary Report on Patentability for Application No. PCT/EP2013/059954, mailed on Jul. 10, 2014, 6 pages.
International Preliminary Report on Patentability for Application No. PCT/EP2013/071070, mailed Nov. 21, 2014, 6 pages.
International Preliminary Report on Patentability for Application No. PCT/GB2014/053017, mailed on Dec. 10, 2015, 19 pages.
International Preliminary Report on Patentability for Application No. PCT/GB2016/051729, mailed on Sep. 20, 2017, 11 pages.
International Preliminary Report on Patentability for International Application No. PCT/EP2013/071070, mailed Jun. 19, 2015, 13 pages.
International Preliminary Report on Patentability for PCT/GB2014/053027 mailed Dec. 10, 2015, 19 pages.
International Search Report and Written Opinion for Application No. PCT/EP2013/059954, mailed on Sep. 25, 2013, 8 pages.
International Search Report and Written Opinion for Application No. PCT/GB2016/051729, mailed on Aug. 22, 2016, 20 pages.
International Search Report and Written Opinion for Application No. PCT/EP2013/071070, mailed on Apr. 2, 2014, 6 pages.
International Search Report and Written Opinion of the International Searching Authority for PCT/GB2014/053027, mailed Apr. 22, 2015, 13 pages.
Japanese Office Action, Application No. 2018-033546, dated Oct. 29, 2019, 14 pages.
"Load Detecting Power Supply," National Semiconductor RD-1066 Production Applications Design Center, Dec. 2008, 17 pages.
Notice of Allowance for Japanese Application No. 2015-512037, dated Dec. 15, 2015, 5 pages.
Notice of Opposition for European Application No. 14784354.4, mailed Feb. 20, 2020, 43 pages.
Notice of Opposition for European Application No. 14784354.4, mailed Feb. 20, 2020, 69 pages.
Notice of Opposition mailed Oct. 8, 2019 for European Application No. EP13779773.4, 7 pages.
Notice to File a Response mailed Oct. 19, 2016 for Korean Application No. 10-2015- 7010072, 12 pages.
Office Action and Search Report mailed Sep. 29, 2019 for Chinese Application No. 201680038584.9, 17 pages.
Office Action dated Mar. 21, 2016, for Chinese Application No. 201380025370.4, 23 pages.
Office Action dated Nov. 17, 2017 for Chinese Application No. 201480055728.2, 8 pages (20 pages with translation).
Office Action for Canadian Application No. 2,872,764, dated Aug. 31, 2016, 6 pages.
Office Action for Canadian Application No. 2,872,764, dated Oct. 5, 2015, 6 pages.
Office Action for Canadian Application No. 2,886,922, dated Mar. 4, 2016, 3 pages.
Office Action for Canadian Application No. 2,922,280, dated Jan. 20, 2017, 4 pages.
Office Action for Canadian Application No. 2,997,062, dated Mar. 4, 2019, 6 pages.
Office Action for Chinese Application No. 201380025370.4, dated Oct. 11, 2016, 3 pages (8 pages with translation).
Office Action for Chinese Application No. 201380054442.8, dated Jun. 28, 2017, 8 pages (20 pages with translation).
Office Action for Japanese Application No. 2015-537196, dated Mar. 22, 2016, 3 Pages (7 pages with translation).
Office Action for Japanese Application No. 2015-537196, dated Nov. 22, 2016, 4 pages (9 pages with translation).
Office Action for Japanese Application No. 2017-153826, dated Jun. 19, 2018, 3 pages (6 pages with translation).
Office Action for Japanese Application No. 2018-033546, dated Feb. 15, 2019, 5 pages (12 pages with translation).

(56)　　　　　References Cited

OTHER PUBLICATIONS

Office Action mailed Aug. 11, 2020 for Japanese Application No., 2019112583, 6 pages.
Office Action mailed Jun. 17, 2020 for Russian Application No. RU201603517, 10 pages.
Office Action mailed Oct. 17, 2019 for Korean Application No. 10-2018-7038106, 17 pages.
Office Action mailed Oct. 24, 2019 for Japanese Application No. 2018-033546, 14 pages.
Office Action mailed May 9, 2017 for Japanese Application No. 2016-520611, 13 pages.
Office Action mailed Apr. 27, 2018 for Korean Application No. 20157010072, 10 pages (19 pages with translation).
Office Action mailed Apr. 27, 2018 for Korean Application No. 2018-028946712, 19 pages.
Office Action mailed Aug. 11, 2016, for Korean Application No. 10-2014-7035205, 11 pages.
Office Action mailed dated Aug. 7, 2017 for European Application No. 13779773, 2 pages.
Office Action mailed Dec. 28, 2018 for Korean Application No. 10-2018-7014831, 8 pages (15 pages with translation).
Office Action mailed Jul. 26, 2017, for Korean Application No. 10-2016-7009422,9 pages (with translation 17 pages).
Office Action mailed Sep. 23, 2016, for Korean Application No. 10-2014-7035201, 12 pages.
Ortman T., "ProVari Menu Tour," published on Mar. 10, 2011, Youtube, as available at https://www.youtube.com/watch?v=IPKQOgQ42z8, Feb. 18, 2020, 18 pages (with machine-generated transcript).
ProVape., "Screen Capture of ProVari Variable Voltage Information Page," as it appeared on May 8, 2012, via a query on web.archive.org, 10 pages.
ProVape., "ProVari Menu Tour", Youtube, published on Mar. 10, 2011, 18 pages.
ProVape., "ProVari Owner's Manual," 2010, available on https://provape.com/, Dec. 16, 2011, 16 pages.
Sadaphal et al., "Random and Preiodic Sleep Schedules for Target Detection in Sensor Networks", Tata Research Development and Design Centre and Department of Computer Science and Engineering-Indian institute of Technology, Mar. 17, 2008, 12 pages.
Search Report for Chinese Application No. 2019103229551, mailed on Mar. 13, 2021, 3 pages.
Search Report mailed Nov. 30, 2015 for Great Britain Application No. GB1511566.0, 4 pages.

Search Report mailed Mar. 27, 2018 for Russian Application No. 2016147728, 3 pages (6 pages with translation).
Search Report mailed Mar. 28, 2017 for Japanese Application No. 2016-520611, 18 pages (with translation 46 pages).
Second Examination Report for Australian Application No. 2013261801, dated Jun. 23, 2016, 3 pages.
Second Extended Report for Australian Application No. 2013331849, dated Feb. 5, 2016, 3 pages.
Second Extended Report for Australian Application No. 2014333571, dated Jan. 23, 2017, 4 pages.
Third Extended Report for Australian Application No. 2014333571, dated May 23, 2017, 4 pages.
Transactions of the Royal Society of Edinburgh, 1848, vol. XVIII, containing the Makerstoun Magnetical and Meteorological Observations for 1844, Robert Grant & Sons, pp. 419-424.
Vaishali et al., "Random and Periodic Sleep Schedules for Target Detection in Sensor Networks", Journal of Computer Science and Technology, May 2008, vol. 23(3), pp. 343-354.
Williams, Monique et al., "Variability Among Electronic Cigarettes in the Pressure Drop, Airflow Rate, and Aerosol Production" Nicotine & Tobacco Research Advance Access, Oct. 12, 2011, 8 pages.
Written Opinion for Application No. PCT/EP2013/059954, mailed on Apr. 16, 2014, 5 pages.
Youtube., "A PBusardo Review—The Provari V2—Provape," published on Feb. 28, 2012, https://www.youtube.com/watch?v=FG9DQbowrDA, 1 page.
Youtube., "Tips & Tutorial for Using Your ProVape Electronic Cigarette", Vlogger Phil Busardo, published on Jun. 30, 2012, 5 pages.
Decision of Refusal in corresponding Japanese Patent Application No. 2022-015066 dated Jan. 31, 2024, all pages cited in its entirety.
Notice of Opposition Against European Patent No. EP4074204B1, mailed Aug. 18, 2025, all pages cited in its entirety.
Wikipedia contributors. "Sleep mode." Wikipedia, The Free Encyclopedia. Wikipedia, Web. Oct. 22, 2025.
Notice of Opposition Against European Patent No. EP3485747, Opponent JT International S.A., mailed Apr. 4, 2023, all pages cited in its entirety.
Respective Letter of Oct. 9, 2020, Exhibit D6 of the Notice of opposition Against European Patent No. EP3485747, Opponet JT International S.A., Apr. 4, 2023.
Feature Analysis, Claim 1, structure of Claim 1 of the opposed Patent, Exhibit D5 of the Notice of opposition Against European Application No. EP3485747, Opponet JT International S.A., Apr. 4, 2023.

* cited by examiner

ELECTRONIC INHALATION DEVICE WITH SUSPENSION FUNCTION

RELATED APPLICATION

This application is a continuation of application Ser. No. 15/231,359 filed Aug. 8, 2016; which is a division of application Ser. No. 14/432,752 filed Mar. 31, 2015, which is a National Stage of International Application No. PCT/EP2013/071070, filed Oct. 9, 2013, which in turn claims priority to and benefit of United Kingdom Patent Application No. GB1218817.3, filed Oct. 19, 2012, each of which is hereby fully incorporated herein by reference.

TECHNICAL FIELD

This specification relates to electronic inhalation devices such as electronic smoking devices, including electronic cigarettes.

BACKGROUND

Electronic inhalation devices such as electronic smoking devices, including electronic or e-cigarettes, may be cigarette-sized and function by allowing a user to inhale a nicotine vapor from a liquid store by applying a suction force to a mouthpiece. Some electronic inhalation devices have a pressure sensor that activates when a user applies the suction force and causes a heater coil to heat up and vaporize the liquid

SUMMARY

An electronic inhalation device comprising a power cell and a computer, where the computer comprises a computer processor, a memory and an input-output means; wherein the computer is configured in use to enter a menu mode when a user activates the menu mode.

By activating a menu mode, the user is able to interface with the electronic inhalation device and configure it accordingly. This is an advantage for the user who can customize certain settings according to their use preferences.

Suitably, the electronic inhalation device is an electronic cigarette.

Suitably, the computer is a microprocessor.

Suitably, the menu mode enables a user to select a menu option from two or more menu options.

Suitably, the menu mode enables a user to alter an operational parameter of the device.

Having two or more options gives the user a greater degree of freedom for configuration and alteration of operation parameters.

Suitably, the computer comprises a normal mode that allows a user to use the device for its primary function and inhale using the inhalation device. Suitably, the computer is configured in use to change from normal mode to menu mode when a user activates the menu mode. Suitably, in menu mode the normal mode function of inhalation is suspended.

In normal mode, the user is able to use the electronic inhalation device for its primary purpose which is to inhale substances used in nicotine replacement therapy. Suspending this normal mode when a user enters the menu mode provides enhanced safety for the user and the ability to use the device for a function other that inhaling substances, namely operating the menu to change operational parameters.

Suitably, the menu mode is activated by a user interacting with the device. Suitably, a menu option is selected by a user interacting with the device.

Suitably, the device comprises an input device connected to the computer and the menu mode is activated through the input device. Suitably, the device comprises an input device connected to the computer and a menu option is selected through the input device.

Suitably, the input device comprises a switch. Suitably, the input device comprises a button.

By providing an input device connected to the computer, a user is able to easily access the computer menu system.

Suitably, the input device comprises a pressure sensor. Suitably, the computer is configured in use to enter the menu mode when the pressure sensor detects operation of the device outside of normal mode use.

Suitably, the computer is configured to enter the menu mode when the pressure sensor detects blowing into the device. Suitably, the computer is configured to enter the menu mode when the pressure sensor detects sucking on the device.

Suitably, the computer is configured to enter the menu mode when the pressure sensor detects a short burst of blowing into the device. Suitably, the computer is configured to enter the menu mode when the pressure sensor detects a short burst of sucking on the device.

Suitably, the computer is configured to enter the menu mode when the pressure sensor detects two or more short bursts of blowing into the device. Suitably, the computer is configured to enter the menu mode when the pressure sensor detects two or more short bursts of sucking on the device.

A pressure sensor may in normal mode be used to identify when a user is inhaling on the device so as to activate the vaporizer to vaporize a liquid for inhalation. Using the same pressure sensor as an input device therefore reduces the number of components needed for a device and provides the user with a means to enter a menu mode and control menu option selection.

Suitably, the device further comprises a vaporizer having a heating element. Suitably, the vaporizer is prevented from activating when the device is in menu mode.

It is advantageous to disable the vaporizer in menu mode since this provides greater safety for the user. Also, when the pressure sensor is used as an input device for the menu mode, this prevents unintended activation of the vaporizer.

Suitably, in menu mode, a selected menu option changes an electrical current delivered to the heating element. Suitably, in menu mode, a selected menu option changes an electrical current profile delivered to the heating element.

Suitably, in menu mode, when the device comprises a pressure sensor, a selected menu option changes a threshold pressure value at which the heating element is activated.

Suitably, in menu mode, a selected menu option changes a power delivered to the heating element.

Suitably, in menu mode, a selected menu option changes a vaporization parameter.

Suitably, in menu mode, a selected menu option changes a heating element activation time.

Suitably, in menu mode, a selected menu option enables a vapor boost which provides increased power to the heating element at the start of an inhalation.

Suitably, the heating element is a heating coil.

Suitably, in menu mode, a selected menu option enables calibration of the device. Suitably, in menu mode, a selected menu option enables a parameter to be adjusted to calibrate the device. Suitably, calibration comprises adjusting the current supplied to the heating element. Suitably, calibration comprises adjusting the vaporization effect of the coil.

Suitably, the device further comprises a liquid in a liquid store and the calibration comprises adjusting the amount of liquid that is vaporized by the heating element.

Advantageously, the menu mode allows the control and modification of parameters that affect the technical operation of the device. This enables a user to change variables that affect vaporization thereby providing an enhanced and customized product for the user.

Suitably, in menu mode, a selected menu option enables the device to be reset.

Since settings can be changed by the user, it is advantageous to supply a means to reset the device to factory settings.

Suitably, the device further comprises use data relating to a user's use of the device, and the use data is stored in the computer memory. Suitably, in menu mode, a selected menu option clears the use data from the computer memory. Suitably, in menu mode, a selected menu option activates the transmission of the use data.

Another advantage of the menu mode is that it enables control of functions outside the normal use of the electronic inhalation device. This gives the device further technical function and provides a more useful device for the user. Providing a more useful device may lead to better adherence to usage.

Suitably, the device further comprises an audio signaling means. Suitably, in menu mode, data relating to a user's use of the device is transmitted using the audio signaling means.

Suitably, the device is configured to notify a user by a sound signal when the device enters the menu mode. Suitably, the device is configured to notify a user by a sound signal when the device leaves the menu mode. Suitably, the device is configured to notify a user by a sound signal as the user navigates through menu options. Suitably, the device is configured to notify a user by a sound signal when a menu option is selected.

Using sound to notify the user of menu operations has the advantage that a number of different sound signals can easily be used that a user is able to distinguish between. Thus a user can easily identify where they are in the menu system without having to look at the device. This is especially an advantage when the device is controlled using a pressure sensor since the device will be in a user's mouth and a user will find it difficult to look at it. However, when the device is in the mouth, it will be near the user's ears so the sound will be easily heard.

Suitably, the device is configured to leave menu mode after a predetermined time of device inactivity.

Suitably, in menu mode, a selected menu option causes the device to leave the menu mode.

Suitably, the device comprises a control unit comprising the power cell and the computer, and the control unit is releasably-attachable to a vaporizer unit, wherein the device is configured to leave the menu mode when the vaporizer is disconnected from the control unit.

As used herein the term electronic smoking device includes not only an electronic cigarette but also electronic smoking articles other than an electronic cigarette, for example a heat-not-burn (HNB) device or an electrically powered spray device in which a pressurized liquid is stored in a canister and released under the control of an electronic valve in response to a pressure drop produced by the user drawing on the device. These devices are referred to herein collectively as "electronic smoking devices", which term is intended to cover any electronic device which can be used as a substitute for a cigarette or as a cessation device, which does not involve the conventional combustion of tobacco.

BRIEF DESCRIPTION OF THE DRAWINGS

Embodiments will now be described, by way of example only, with reference to the accompanying drawings in which.

DETAILED DESCRIPTION

Figure 1:
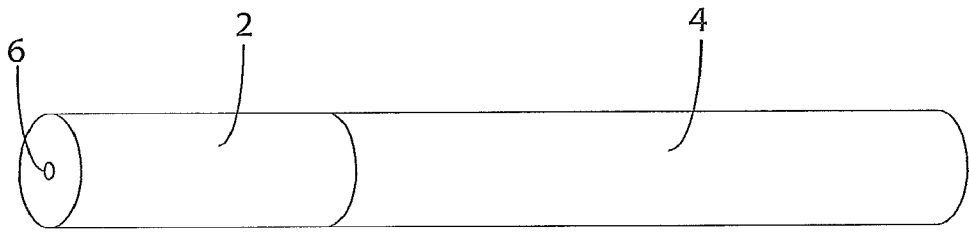
FIG. 1 is a side perspective view of an electronic inhalation device.
Figure 2:
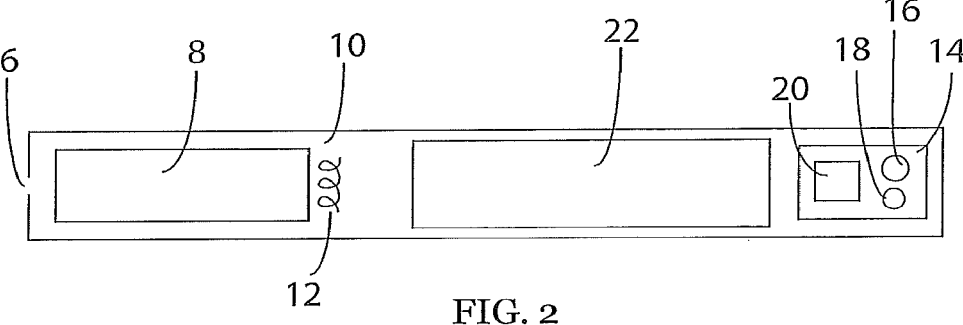
FIG. 2 is a side sectional view through the device of FIG. 1.

Referring to FIG. 1 and FIG. 2 there is shown an electronic inhalation device in the form of a cigarette-shaped electronic cigarette. The electronic cigarette has a mouthpiece 2 and a cigarette body 4. The mouthpiece 2 has an air outlet 6 at a first end and is connected to the cigarette body 4 at a second end.

Inside the electronic cigarette there is a liquid store 8 towards the mouthpiece end and a vaporizer 10 having a heating coil 12. The vaporizer 10 is arranged next to the liquid store 8 to allow liquid to be transferred onto the vaporizer 10 for vaporizing. A circuit board 14 contains a pressure sensor 16, an audio signaling means 18 such as a buzzer or a speaker, and a computer 20. A power cell 22 provides power to the device.

The general operation of the electronic cigarette is similar to that of known devices. When a user takes a draw on the electronic cigarette, a suction force is applied to the mouthpiece 2 and the air outlet 6. A reduced pressure inside the electronic cigarette causes the power cell 22 to provide power to the vaporizer 10 which in turn vaporizes the nicotine liquid solution. The resultant vapor is then inhaled by the user.

In this example the operation of the electronic cigarette goes beyond that of a general device. In a normal operating mode, when a user applies a suction force to the electronic cigarette, the resultant airflow causes a drop in pressure from ambient pressure to a lower pressure, within the device. The pressure sensor 16 provides a signal to the computer 20. The computer 20 runs software that monitors the pressure signal from the pressure sensor 16 and when it determines that the pressure has been reduced below a threshold pressure, the computer 20 provides an electrical current to the heating coil 12 in order to heat the heating coil 12 and vaporize liquid from the liquid store 8.

The software running on the computer 20 controls the operation of the device. The computer 20 allows a user to enter a menu mode. When a user has finished using the device and wishes to enter a menu mode they can activate the menu mode by carrying out an action on the device that is different to how they use it in a normal mode. In a normal mode, a user typically inhales on the device for 2 to 3 seconds, replicating the action of smoking a real cigarette. In this situation the computer 20 receives a signal from the pressure sensor 16 and activates the vaporizer 10, heating up the heating coil 12.

To enter a menu mode, a user can blow briefly into the device. The pressure sensor 16 sends a signal to the computer 20, and the computer recognizes that this is not normal operation but a signal to enter a menu mode. Alternatively a user can blow briefly into the device, suck suddenly on the device in a quick burst or indeed blow or suck two or more times in rapid succession. In each of these circumstances, the pressure sensor 16 will send a signal to the computer 20 and the computer 20 will determine that this is not normal operation but a signal for the device to enter a menu mode.

When the device enters the menu mode the user is notified by a sound being played by the audio signaling means 18. In addition, the normal operation of vaporization is suspended. In this way, whilst the user is in menu mode, the user can suck or Now on the device without activating the vaporizer 10 and heating coil 12.

After entering a menu mode, the user is able to control the menu and navigate through the menu options using the pressure sensor for control. For example, slight blowing on the device could move forward through the menu options, and slight sucking could move backwards through the menu options. By having a sensitive control of the menu options, the user would not interfere with the liquid transfer process of the liquid out of the liquid store 8 and onto the vaporizer 10.

As a user progresses through the menu options, the user is notified by sound signals and is able to differentiate between the menu options by the different sound signals. For example a first menu option could sound a single beep, a second menu options could sound a double beep and so on.

When a user wishes to select a menu option then again they can do this by sucking or blowing into the device. For instance, if slight pressure change is used to control the navigation through the menu as described, a more forceful pressure change from a more forceful sucking or blowing can select a menu option.

In this way, the user is able to have complete control of the menu options including navigating through the different menu options and selecting a given menu option.

The menu options are selectable to change the technical configuration of the electronic inhalation device. One of the menu options is selectable to configure the vaporization properties. A user can select this option and set the vaporization lower or higher. The computer 20 would then act to modify the current sent to the heating coil 12 to change the vaporization properties during normal use.

Another menu option is to provide a boost such that at the start of the vaporization during normal use, a higher current is delivered providing a peak in the temperature and an initial boost to vaporization.

Another menu option acts to calibrate the device. If the device is required to have a fixed amount of liquid vaporization per unit time, then the control of vaporization could be used to achieve this.

Another menu option acts to change the device country settings. Different countries may have different tastes and requirements for vaporization and vapor delivery so enabling the user to select their host country would provide a simple means for them to achieve this. This enables a single product to be sold across multiple territories.

Another menu option acts to change the threshold pressure at which the device is activated during normal operation. This enables the threshold pressure to be increased or decreased. Changing of the threshold pressure could also be a result of the country selection by the user because a given location may be at a particular altitude and this affects the ambient pressure, which may have an impact on the threshold pressure.

Another menu option acts to modify the heating element activation time. In normal mode, a user inhaling on the device activates the heating coil to vaporize liquid. In an example use, the vaporizer may be activated for a predetermined time once activated and this time may be modified using the menu system.

Another menu option acts to modify other time parameters such as the time an electronic inhalation device is deactivated following a coil overheat scenario or the time until a device is deactivated following lack of use of the device.

Another menu option acts to reset the device such that the variables and parameters modified by the user are reset back to factory conditions.

The computer 20 comprises a memory means and use data corresponding to the user's use of the device can be stored in the memory means. Another menu option acts to initiate transmission of this data. Once activated the data may be transmitted using modulated sound and received by a device configured to interpret this modulated sound signal. A related menu option acts to wipe the data from the memory, thereby clearing the memory.

Another menu option acts to leave the menu mode, returning the device to a normal mode. A user is notified by a sound signal that the menu mode has been exited and a normal mode has been entered into.

In addition, whilst in menu mode, if the computer 20 determines that the device is inactive for a given threshold inactive time, the device leaves menu mode and may enter either a normal mode or a sleep mode, the sleep mode being a lower power mode.

Figure 3:
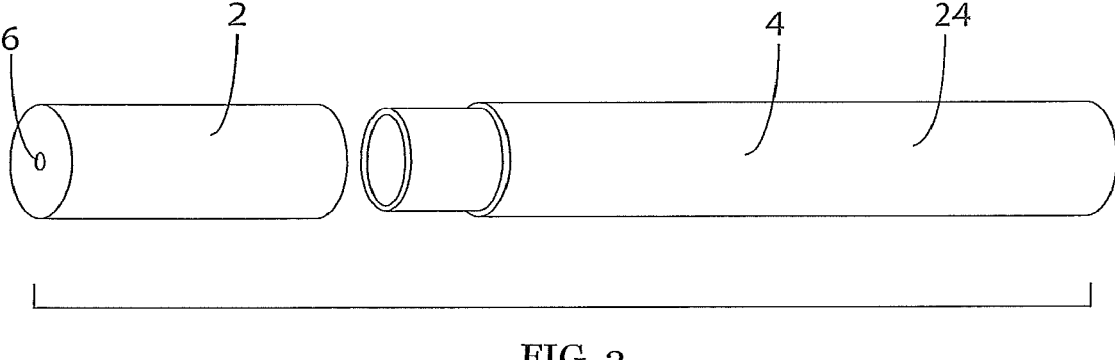
FIG. 3 is an exploded side perspective view of an electronic inhalation device having separated mouthpiece and control unit.
Figure 4:
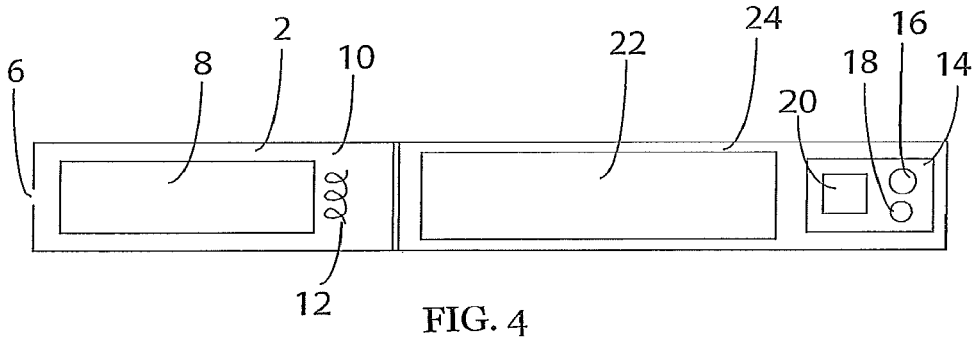
FIG. 4 is a side sectional view through the device of FIG. 3 with connected mouthpiece and control unit.

FIG. 3 and FIG. 4 show a device similar to that shown in relation to FIG. 1 and FIG. 2. The difference is that the mouthpiece 2 is releasably-attachable to the cigarette body 4. The mouthpiece comprises a female screw thread connection means, the cigarette body 4 is a control unit 24 having a male screw thread connection means. The mouthpiece 2 and the control unit 24 can be screwed together or taken apart.

In this example, the mouthpiece 2 comprises the liquid store 8 and the vaporizer 10 with heating coil 12. The control unit 24 comprises the power cell 22 and circuit board 14 with pressure sensor 16, audio signaling means 18 and computer 20. The screw thread connection provides an electrical connection such that when the mouthpiece 2 and control unit 24 are screwed together, electrical current can be delivered to the heating coil 12 upon activation of the vaporizer 10.

In this example, the device can only enter a menu mode when the parts are assembled since the user can only operate the device when it is assembled. Whilst in menu mode, if the user disconnects the mouthpiece, the device leaves menu mode and the user is notified by a sound signal.

Figure 5:
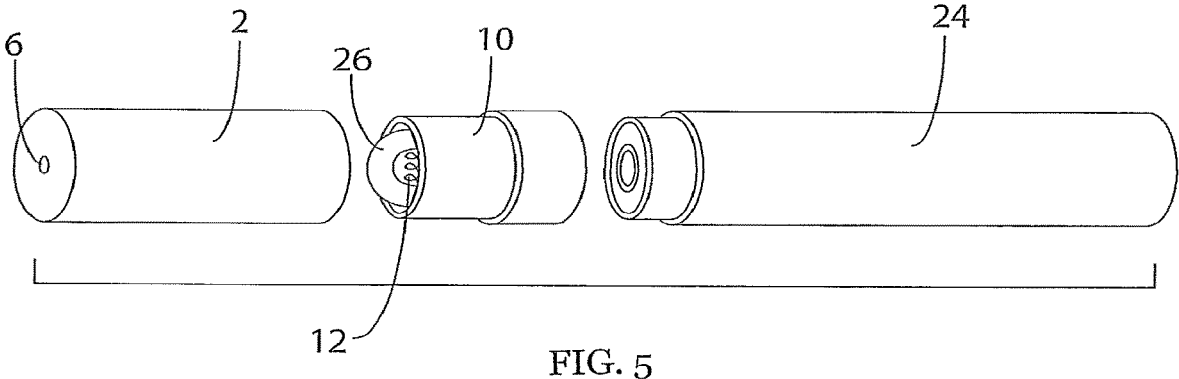
FIG. 5 is an exploded side perspective view of an electronic inhalation device having separated mouthpiece, vaporizer and control unit.
Figure 6:
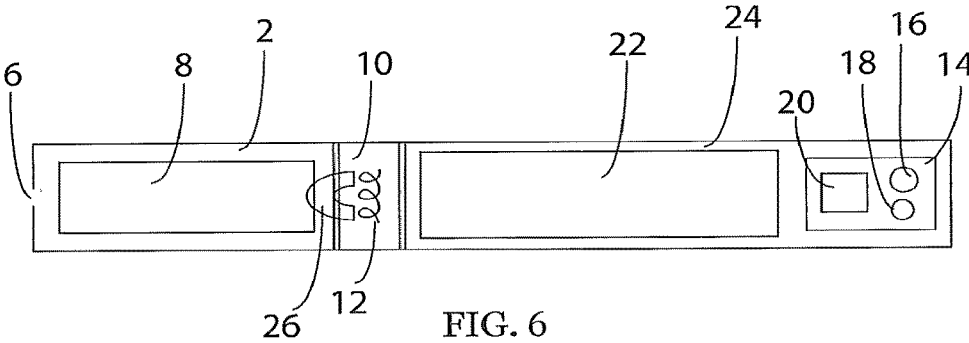
FIG. 6 is a side sectional view through the device of FIG. 5 with connected mouthpiece, vaporizer and control unit.

FIG. 5 and FIG. 6 show a device similar to that shown in relation to FIG. 3 and FIG. 4. However in this example, the vaporizer 10 is removable from the mouthpiece 2. The mouthpiece 2 has a cylindrical opening that forms a inter-ference push-fit with the vaporizer 10. As such the mouth-piece 2 can be separated from the vaporizer 10. The mouth-piece 2 comprises the liquid store 8. The vaporizer 10 comprises the heating coil 12 and a wick 26. The wick 26 protrudes from the end of the vaporizer 10 such that when the mouthpiece 2 and the vaporizer 10 are connected, the wick 26 dips into the liquid store 8.

In use, as a user inhales on the device, liquid is transferred from the liquid store 8 and onto the wick 26 before being transferred onto the heating coil 12 for vaporization.

Figure 7:
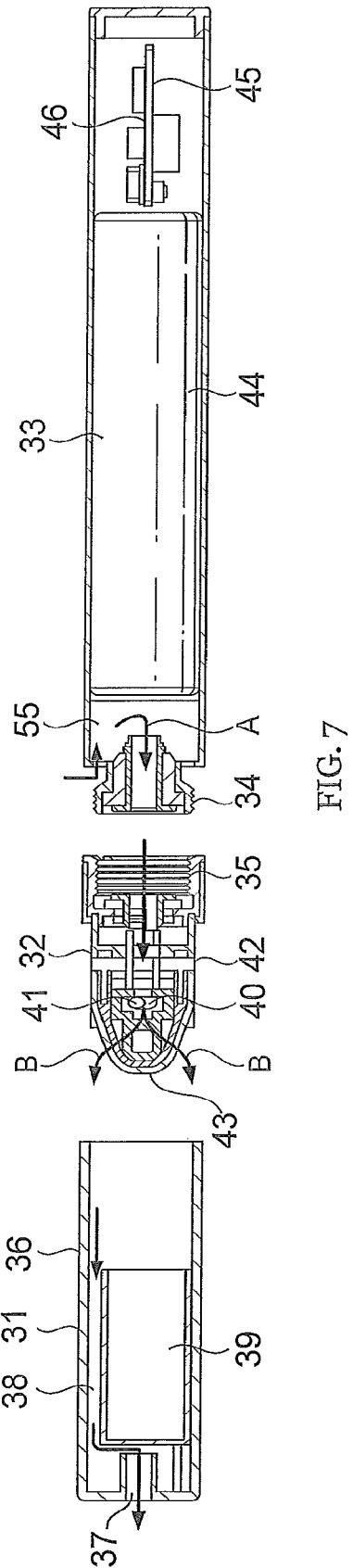
FIG. 7 is an exploded longitudinal sectional view of another embodiment of an electronic inhalation device similar to that of FIGS. 3 and 4, and that of FIGS. 5 and 6, showing the internal components thereof in greater detail.
Figure 8:
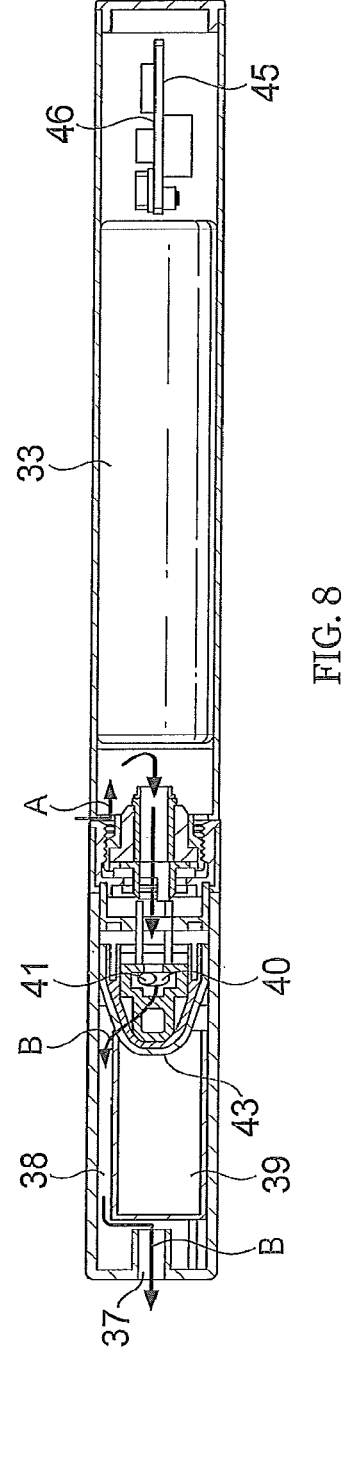
FIG. 8 is a sectional view of the electronic inhalation device of FIG. 7 when assembled.

FIGS. 7 and 8 illustrate another embodiment of an elec-tronic inhalation device in the form of an electronic ciga-rette. The device is similar to the embodiment shown in FIGS. 3 and 4, and the embodiment shown in FIGS. 5 and 6, although the embodiment in FIGS. 7 and 8 shows the internal components thereof in greater detail. The device comprises a mouthpiece 31, vaporizer device 32 and control unit 33 which can be assembled as shown in FIG. 8 to provide a generally cylindrical device that can be used as a substitute for a conventional tobacco burning cigarette. The control unit 33 is provided with a threaded extension 34 that is received in an interior thread 35 in the vapor device 32. The mouthpiece 31 comprises a generally cylindrical plas-tics casing 36 that can be push-fitted on to the vapor device 32.

The mouthpiece 31 has an outlet 37 to supply vapor to the mouth of the user and an outlet passageway 38 for the vapor which, in use is produced by the vapor device 32. The mouthpiece 31 also includes a liquid reservoir comprising a porous storage matrix 39 such as plastics open foam material impregnated with a vaporizable liquid, such as a nicotine containing liquid that in use is vaporized by the vapor device 32. The matrix 39 acts as a reservoir for the liquid and since the mouthpiece 31 is readily removable and replaceable, it can be used as a refill capsule when the liquid in the porous matrix 39 becomes depleted and needs to be replenished.

The vapor device 32 includes an electronic heating coil 40 that is wound around a ceramic core 41, supported on a ceramic base 42. A generally U-shaped wicking member 43 is configured to wick liquid from the reservoir 39 towards the heating element 40 by capillary action. The wicking member 43 may for example by made of a metallic foam such as nickel foam.

The heater coil 40 is powered by a rechargeable battery 44 located in the control unit 33 through electrical contacts 48, 49 (not shown in FIGS. 7 and 8, see FIG. 9) which electrically couple the heater coil to the battery 44 when the control unit 33 is fitted to the vapor device 32 by the engagement of threads 34, 35. The electrical power of the battery 44 is supplied to the heater coil 40 under the control of a control circuit 45 mounted on circuit board 46 within the control unit 33.

Figure 9:
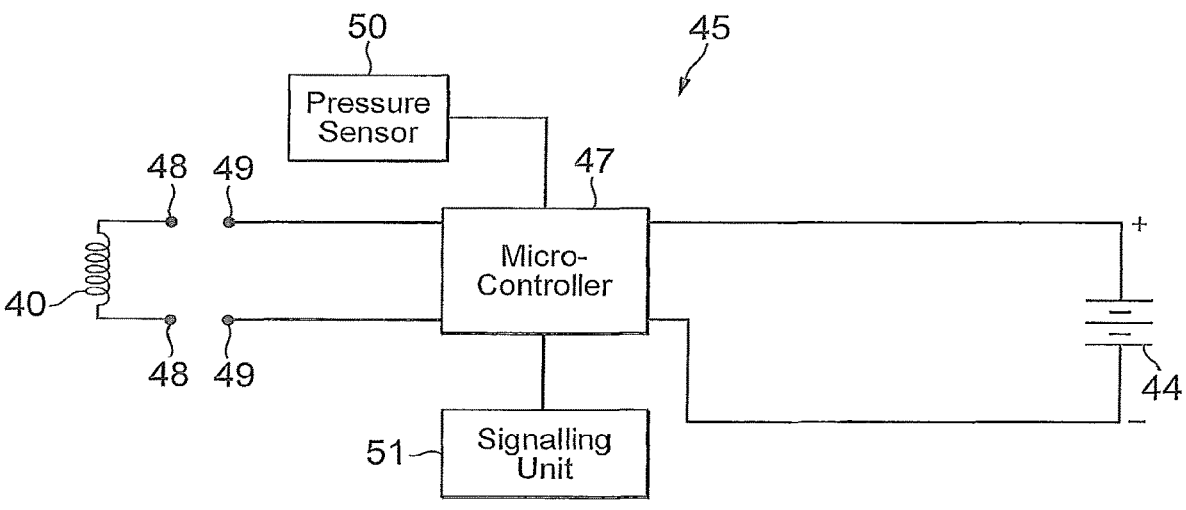
FIG. 9 is a schematic circuit diagram of the electronic inhalation device of FIGS. 7 and 8.

As shown in FIG. 9, the control circuit 45 includes a microcontroller 47 powered by battery 44 to supply an electric heating current to the coil 40 through the contacts 48, 49 that are brought into electrical connection when the control unit 33 is threadedly engaged with the vapor device 32 by means of threads 34, 35 shown in FIG. 7.

A pressure sensor 50 detects when a user draws on the mouthpiece 38, as described in more detail hereinafter.

Also, a signaling unit 51 is provided to provide audio or visual outputs to the user indicative of operational condi-tions of the device. For example, the signaling device may include a light emitting diode that glows red when the user draws on the device. The signaling device may provide predetermined audio or visual signals to indicate for example that the battery 44 needs to be recharged.

The supply of current from the battery 44 to the mouth controller is controlled by switching transistor 52.

When the user draws on the mouthpiece 1 so as to draw vapor through the outlet 37, the pressure sensor 50 detects the drop in pressure which is communicated from within the vapor device 32 through the interior of the control unit 33 to the circuit board 45. Microcontroller 47 responds to the pressure drop detected by the sensor 50 to supply electrical current to the heater coil 40, which vaporizes liquid supplied by capillary action through the U-shaped wicking member 43. An air inlet passageway 55 is provided in the joint between the vapor unit 32 and control unit 33 so that air can be drawn through the threaded extension 34 of the control unit 33 into the vapor device 32 in the direction of arrows A, so that the resulting vapor is drawn in the direction of arrows B through passageway 38 to the outlet 37.

The operation of the device of FIGS. 7 and 8 may be the same as that of the devices of FIGS. 1 to 6 described previously and so a detailed description of such operation will not be repeated here. However, it is intended that the control circuit 46 of the embodiment of FIGS. 7 and 8 may be configured as per the circuit board 14 of the embodiments of FIGS. 1 to 6, and vice versa. Specifically, the circuit board 46 may comprise a separate audio signaling means 18. Alternatively, the signaling unit 51 may act as the audio signaling means described in the previous embodiments. Also, the pressure sensor 50 may be disposed on the circuit board 46 within the control unit 33 and the vapor device 32 may be in fluid communication with the area within the control unit 33, via an open passageway for example (not shown), such that a drop in pressure within the vapor device 32 is detectable by a pressure sensor on the circuit board 46 within control unit 33. Also, the microcontroller 47 of the embodiment of FIGS. 7 and 8 may be programmed as per the computer 20 of the embodiment of FIGS. 1 to 6 to monitor the measured pressure from the pressure sensor 16 to control the device accordingly and as described previously, particu-larly to run software to control the various menu modes as described previously.

Although examples have been shown and described, it will be appreciated by those skilled in the art that various changes and modifications might be made without departing from the scope of the claims. The computer processor could be a microprocessor or a microcontroller. The device is not restricted to being cigarette shaped. The computer processor, audio signaling means and pressure sensor are not restricted to being on the same circuit board. The heating coil used for vaporization could be replaced by another type of non-coil heating element. The control for the menu could be a button or a switch or some other means, rather than the pressure sensor In order to address various issues and advance the art, the entirety of this disclosure shows by way of illustration various embodiments in which the claimed invention(s) may be practiced and provide for superior electronic inhalation devices. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the dis-closure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future. Any feature of any embodiment can be used independently of, or in combination with, any other feature.

The invention claimed is:

1. An electronic inhalation device comprising a power cell and a computer, where the computer comprises a computer processor, a memory and an input-output means; wherein the computer is configured in use to enter a menu mode when a user activates the menu mode, wherein the device further comprises use data relating to a user's use of the device for its primary function to allow the user to inhale substances using the inhalation device, and the use data are stored in the computer memory, wherein in the menu mode, a selected menu option clears the use data from the computer memory, wherein in the menu mode, a selected menu option enables the user settings of the device be reset to factory settings, and wherein the user blows or sucks two or more times in rapid succession to activate the menu mode thereafter the user is notified by a sound.

2. The electronic inhalation device of claim 1, wherein the electronic inhalation device is an electronic cigarette.

3. The electronic inhalation device of claim 1, wherein the computer is a microprocessor.

4. The electronic inhalation device of claim 1, wherein the menu mode enables the user to select a menu option from two or more menu options.

5. The electronic inhalation device of claim 1, wherein the menu mode enables the user to alter an operational parameter of the device.

6. The electronic inhalation device of claim 1, wherein the computer comprises a normal mode that allows a user to use the device for its primary function and inhale using the inhalation device.

7. The electronic inhalation device of claim 1, wherein the menu mode is activated by the user interacting with the device.

8. The electronic inhalation device of claim 1, wherein a menu option is selected by the user interacting with the device.

9. The electronic inhalation device of claim 1, wherein in the menu mode, a selected menu option enables the device to be reset.

10. The electronic inhalation device of claim 1, wherein the device further comprises an audio signaling means.

11. The electronic inhalation device of claim 10, wherein in the menu mode, data relating to a user's use of the device are transmitted using the audio signaling means.

12. The electronic inhalation device of claim 11, wherein the audio signaling means is configured to transmit the data relating to the user's use of the device using modulated sound.

13. The electronic inhalation device of claim 11, wherein the device is configured to notify the user by a sound signal when the device enters the menu mode.

14. The electronic inhalation device of claim 11, wherein the device is configured to notify the user by a sound signal when the device leaves the menu mode.

15. The electronic inhalation device of claim 11, wherein the device is configured to notify the user by a sound signal as the user navigates through menu options.

16. The electronic inhalation device of claim 11, wherein the device is configured to notify the user by a sound signal when a menu option is selected.

17. The electronic inhalation device of claim 1, wherein the device is configured to leave the menu mode after a predetermined time of inactivity of the device.

18. The electronic inhalation device of claim 1, wherein in the menu mode, a selected menu option causes the device to leave the menu mode.

\*     \*     \*     \*     \*